May 19, 1959     H. G. BRILMYER     2,887,003
BLIND FASTENER HAVING SEPARATE LOCKING COLLAR WITH SHEAR FLANGE
Filed April 6, 1956     3 Sheets-Sheet 1
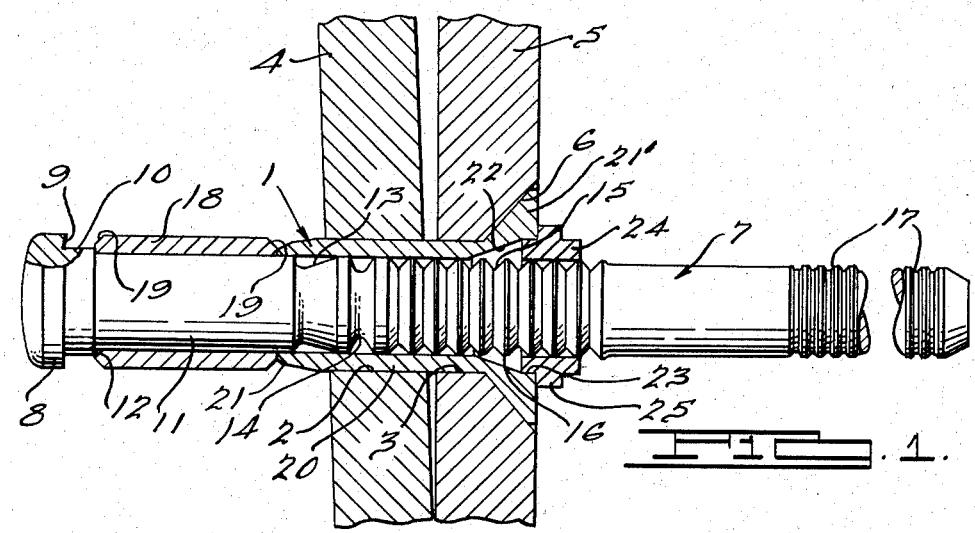
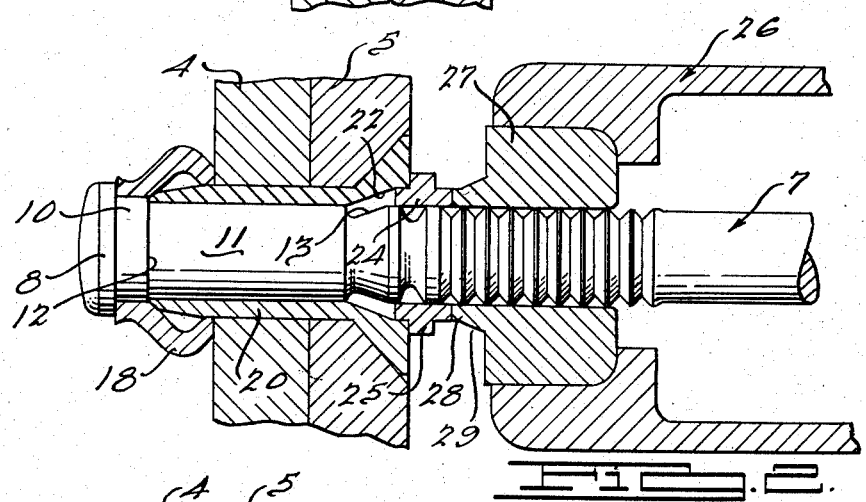
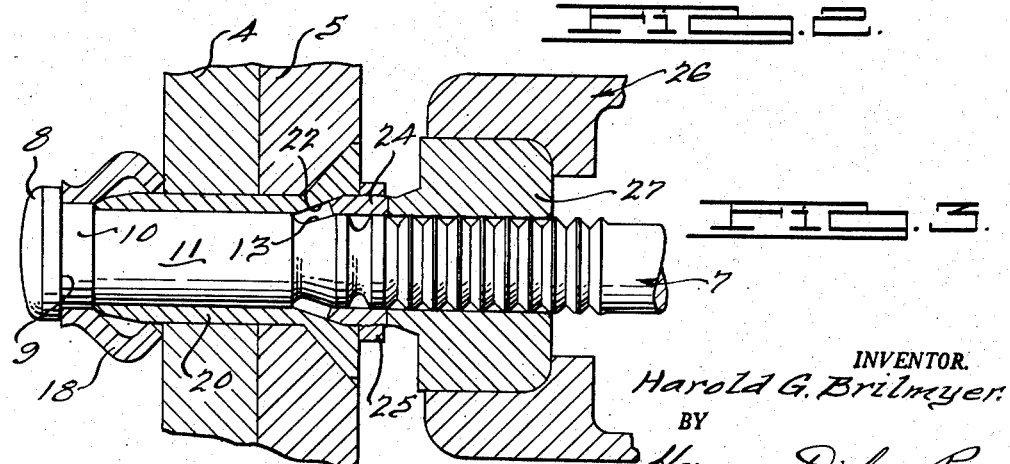
INVENTOR.
Harold G. Brilmyer
BY
Harness, Dickey & Pierce
ATTORNEYS.

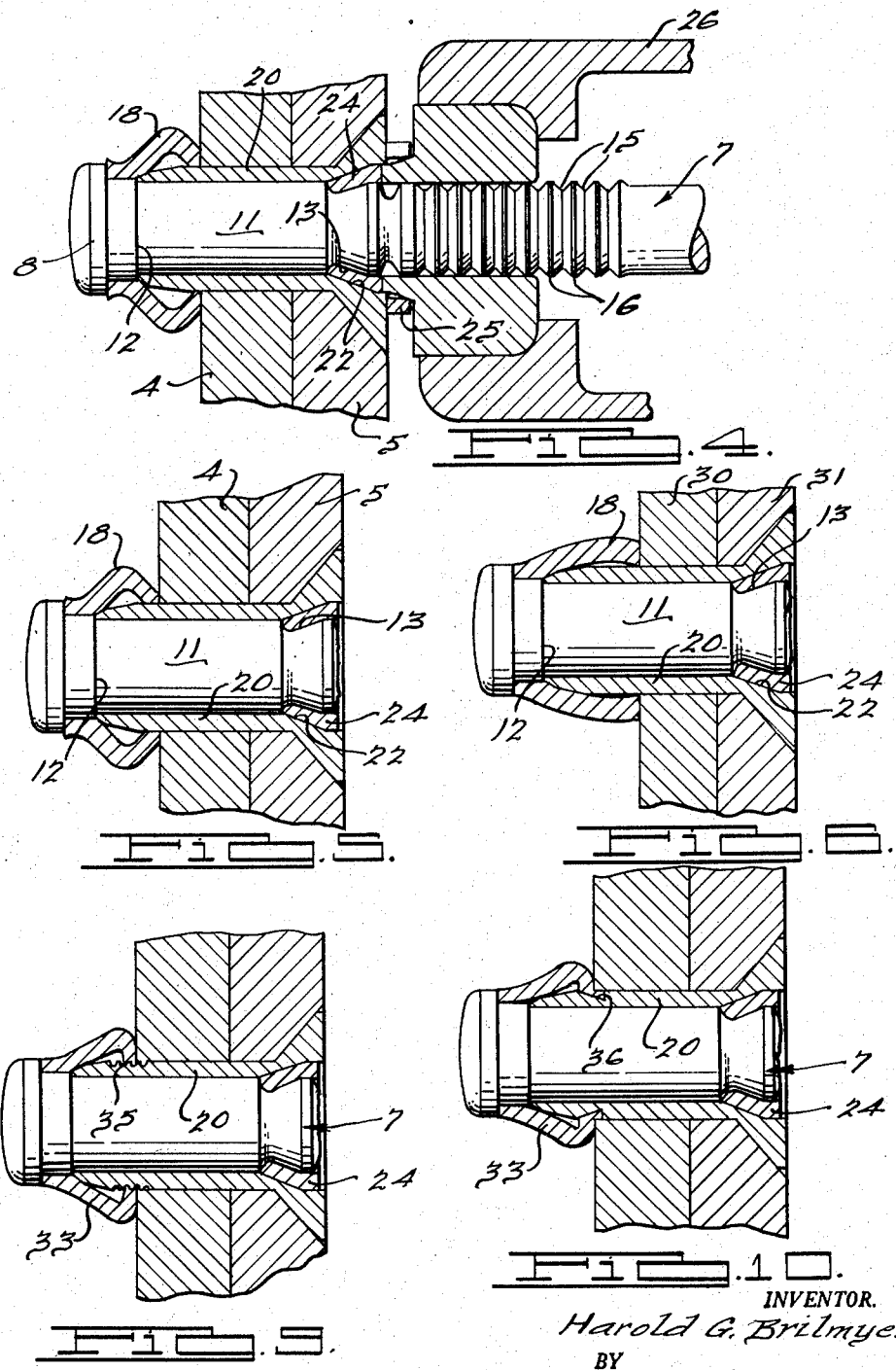

INVENTOR.
Harold G. Brilmyer.
BY
Harness, Dickey & Pierce
ATTORNEYS.

# United States Patent Office 2,887,003
Patented May 19, 1959

2,887,003
BLIND FASTENER HAVING SEPARATE LOCKING COLLAR WITH SHEAR FLANGE

Harold G. Brilmyer, Grosse Pointe, Mich., assignor to Huck Manufacturing Company, a corporation of Michigan Application April 6, 1956, Serial No. 576,735

7 Claims. (Cl. 85—40)

The present invention relates to improvements in blind fasteners.

There has been a demand for some time, particularly in the aircraft industry, for a high strength, alloy steel blind fastener. The fastener of the present invention has particular utility in the aircraft industry with such requirements in mind, but it is also equally applicable for other industries.

The fastener of the present invention is a so-called "blind fastener," which means that it is completely applied from one side only of the work. The assembled fastener comprises a pin, an expanding sleeve, a filler sleeve, and a locking collar. The assembly is applied through the aligned openings in the plates to be fastened together, so that the filler sleeve engages the walls of the openings and projects therethrough, with the expanding sleeve and the head end of the pin projecting beyond the inner surface of the inner panel. The opposite end of the pin is provided with pull grooves, and projects beyond the side where it is adapted to be engaged by a pull gun. By the application of the pull gun, the pin is pulled to push the expanding sleeve over the adjacent end of the filler sleeve to first clamp the parts tightly together, in the event that they are separated, and then form a blind head on the inside or blind side of the fastening. After the blind head is formed, through the reaction of an anvil in the pull gun, the locking collar is forced into a locking space formed by a locking groove in the pin and a cooperating space in the filler sleeve to thus lock the fastening in place. The projecting end of the pin is thereafter broken off substantially flush with the adjacent head of the filler sleeve.

The fastener is designed primarily for use where the elements that are secured together and the fastener are loaded primarily in shear. The elements are nondeflecting, which allows the use of a heat treat process to give ultimate shear strength to the fastening elements, particularly to the pin and filler sleeve. The heat treat is such that substantially all of the ductility is removed from these components, which insures an extremely high shear strength, the minimum being in the neighborhood of 125,000 p.s.i. for the composite filler sleeve and pin.

One of the primary objects of the present invention is to provide improvements in blind fastenings which have very high shear values, as well as good tension values.

A further object of the invention is to provide improvements in blind fastenings which have the advantage of being driven with presently available driving tools with slight modifications.

A further object of the invention is to provide improved blind fasteners in which the final pin position is always the same in the assembled fastening independent of the grip length, so that the fractured break-neck will be located substantially flush or below flush with the head, and no trimming will be required. Thus it is possible to employ a pin which is alloy steel heat treated to over 200,000 p.s.i. in tension where shaving or trimming of any projecting pin portion of the broken break-neck would be entirely impractical.

Other objects and advantages of the invention will become apparent from the following description, the appended claims and the accompanying drawings wherein:

Figure 1 is a cross-sectional view, with parts in elevation, illustrating a fastener assembled with the work prior to any setting operation, in accordance with one form of the present invention;

Fig. 2 is a view similar to Fig. 1, showing the driving tool applied, and with the fastener in an intermediate stage of fastening;

Fig. 3 is a view similar to Fig. 2, and showing a further stage in the setting operation;

Fig. 4 is a view similar to Figs. 2 and 3, and showing a still further stage in the setting operation;

Fig. 5 is a view similar to Figs. 2–4, and showing the fastener as finally set for one grip length;

Fig. 6 is a view similar to Fig. 5, but showing the fastener finally set for a different grip length;

Fig. 9 is a view similar to Fig. 8, and showing a modified form of fastener;

Fig. 10 is a view similar to Fig. 8, and showing a further modified form of the fastener;

Figure 7:
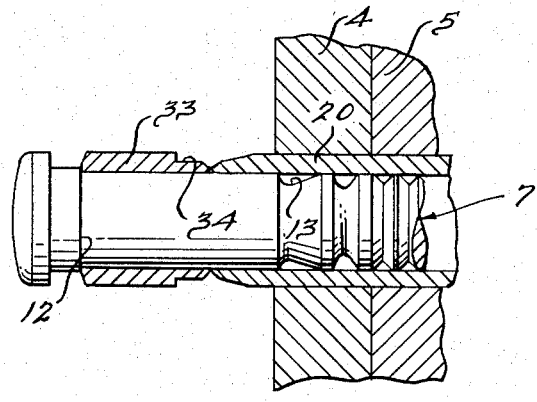
Fig. 7 is a partial view similar to Fig. 1, and illustrating a modified form of the present invention.

Referring to the drawings, and referring particularly to Figs. 1–5 thereof, the blind fastening assembly is generally indicated at 1, and is shown as extending through a pair of aligned openings 2 and 3 in a pair of plates or panels 4 and 5, respectively. In the embodiment illustrated, the panels 4 and 5 are illustrated as being separated, and plate 5 is illustrated as having a countersink 6 formed on one side thereof. The panels 4 and 5 may be of metal, such as steel or aluminum, and, in some installations, may be composites of wood and metal, or plastics.

The fastener assembly 1 comprises a pin generally indicated at 7. The pin 7 is formed of an alloy steel, preferably heat treated to cover 200,000 p.s.i. in tension, so that it is exceptionally hard. The pin 7 has a preformed head 8, which is slightly smaller than the diameter of the openings 2, so that it may project therethrough. The inner annular surface of the head, as indicated at 9, has an outwardly flared angle or undercut of approximately 10°, which, in the embodiment illustrated, is slightly exaggerated for purpose of illustration.

The pin 7 has an annular, smooth land 10 formed adjacent the head 9, with a smooth adjacent portion 11 of reduced diameter providing an annular shoulder or step 12. An annular locking groove 13 is formed in the pin adjacent portion 11, and has a shape tapering inwardly to an increasing depth toward the head 8, as best shown in Fig. 1. A breakneck 14 is formed on the pin adjacent the locking groove with a land formed therebetween.

The adjacent section of the pin is formed with a plurality of longitudinally spaced grooves 15, which are rolled therein, providing centering or guide lands 16 therebetween. The opposite end of the pin is provided with pull grooves 17, which are adapted to be engaged by the pull fingers of a pull gun in a manner similar to that for pulling the lockbolts disclosed in Huck Patents Nos. 2,114,493 and 2,531,048.

An expanding sleeve 18 is disposed over portion 11 of the pin with one end thereof abutting against the shoulder 12. The opposite ends of the expanding sleeve are chamfered, as indicated at 19. This is important to reduce the load differential required to bulb or buckle the expanding sleeve in extreme maximum and extreme minimum grip conditions. The expanding sleeve is preferably made of an austenitic stainless steel, annealed soft when it starts, but, as it is bulbed, it is worked to provide a hardness in the final set fastening.

A filler sleeve 20 is next disposed over the pin, and terminates at one end in an annular tapered portion 21 adjacent the expanding sleeve 18. In the embodiment illustrated, the opposite end is formed with a countersink head 21' to fit within the countersink 6, so that the final fastening is flush with the adjacent surface of panel 5. An inner annular cavity 22 is formed in the head of the filler sleeve and terminates in an annular axial portion 23.

A locking collar 24, having an annular flange 25, is press fitted onto the lands 16 with the inner end projecting inwardly against the annular portion 23 of the filler sleeve. The flange 25 abuts against the adjacent outer surface of the head 21.

The fastener is set by means of a pull gun partially and generally indicated at 26. The gun is not disclosed here in detail, but is similar in structure and operation to the guns disclosed in the above referred to Huck patents, except that the anvil 27 is of a different configuration. The anvil 27 has a protruding or projecting nose 28 in which the end matches the I.D. and O.D. of the locking collar, as best shown in Fig. 2. The projecting end is joined to the main body portion of the anvil 27 by means of a tapered or conical portion 29 for a purpose to be described hereinafter.

To set the fastener it is disposed through the openings of the panels, as shown in Fig. 1. The gun 26 is applied over the projecting end of the pin 7, so that the pull grooves 17 are engaged by the fingers of the gun, as in the Huck patents above mentioned. As the trigger of the gun is operated, the pin 7 is pulled (to the right, viewing Fig. 1), so that the end of the expanding sleeve 18 adjacent the head 8 moves over the shoulder 12 and abuts against the under surface 9 of the head. The opposite end of the expanding sleeve is forced outwardly over the annular tapered portion 21 of the filler sleeve and, as the pin 7 is further pulled, the expanding sleeve is bulbed to the final position shown in Fig. 2.

At this stage in the setting of the fastening, the reaction of this pulling load is taken by the flange 25 of the locking collar 24, as it will be understood that, during the pulling of the pin, the projecting end 28 of the anvil 27 is reacting against the adjacent face of the locking collar 24.

Further bulbing of the expanding sleeve 18 is prevented because of the abutment of the adjacent end of the filler sleeve 20 against the annular shoulder or step 12 on the pin, as shown in Fig. 2. The shoulder 12 is accurately positioned in the design of the pin in relation to the length of the filler sleeve 20, so that the locking portions of the pin and filler sleeve, that is, the overlying position of the locking groove 13 and the annular cavity 22, are in perfect aligned positions to receive the locking collar. This is true regardless of the grip length, as will be seen by comparison of Figs. 5 and 6.

Referring now to Figs. 2 and 3, since the full reaction of the pull on the pin is taken at this stage between the shoulder 12 and the adjacent end of the filler sleeve 20 and the bulbed sleeve 18, the pulling forces build up to a point where the flange 25 on the locking collar 24 is sheared off, as shown in Fig. 3, and the collar 24 is then forced into the space formed by the locking groove 13 and the cavity 22, as shown progressively in Figs. 3 and 4. The strength of the flange 25 prior to shearing must be greater than the pull required to bulb the expanding sleeve sufficient and to properly align the locking cavities by seating the shoulder 12 against the end of the filler sleeve 20; and the maximum strength of the flange 25 must be less than the minimum breakneck strength of the pin 7. The annular flange 25, as shown in Fig. 3, is then forced over the conical portion 29 of the anvil as the lock progresses to its final position, as shown in Fig. 4, and this causes the flange or ring 25 to split and drop away from a position between the anvil of the gun and the head on the filler sleeve.

When the locking collar 24 is forced to its innermost position, the force is further built up on the gun to cause the pin to break at the breakneck 14, so that the final fastening is such as that shown in Fig. 5. It will be noted that the broken end of the pin is substantially flush or underflush with the adjacent outer surface of the locking sleeve.

Comparing Figs. 5 and 6, the fasteners are the same, except that they are employed with different grip lengths. That is, the combined thickness of the panels 4 and 5, as shown in Fig. 5, is greater than the combined thickness of panels 30 and 31, as shown in Fig. 6. The expanding sleeve 18 in Fig. 6 is not bulbed to as great an extent as it is in Fig. 5. However, the filler sleeve 20 abuts against the shoulder 12 in both instances, so that the distance between the shoulder 12 and the locking groove cavity is consistent and the locking cavities are properly aligned regardless of differences in grip length.

As mentioned above, the head 8 of the pin is preferably provided with an undercut or angle of approximately 10°, as indicated at 9. This is important in holding the adjacent end of the expanding sleeve in place, particularly for maximum grip conditions where the expanding sleeve may have a tendency to slip over the head of the pin.

Figure 8:
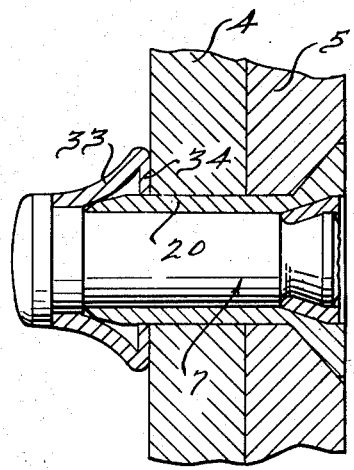
Fig. 8 is a view similar to Fig. 7, but showing such fastening in its finally set form, as in Fig. 5.

Referring to Figs. 7 and 8, a modified form of the present invention is illustrated in which the elements are the same as those described in the embodiment shown in Figs. 1–6, except that the expanding sleeve 33 has a different configuration. In this embodiment, the expanding sleeve has an end 34 of reduced diameter adjacent the filler sleeve 20. The end indicated at 34 is thus of a reduced thickness and, when pulled and bulbed, a blind head will be formed having a configuration such as that shown in Fig. 8. The bearing area of the expanding sleeve against the adjacent panel 4 will be considerably increased with this modification, and an improved tensile yield is possible due to the confined "structural" triangle formed.

In Figs. 9 and 10, further modified forms of the structure shown in Figs. 7 and 8 are illustrated.

In Fig. 9, the outer surface of the expanding sleeve 20 is formed with a series of annular grooves 35 against which the adjacent end of the expanding sleeve 34 abuts to provide an interlock. In Fig. 10, an annular locking groove 36 is formed in the outer surface of the filler sleeve 20, and the adjacent end of the expanding sleeve 33 is forced into the annular locking groove 36 to provide an interlock.

Figure 11:
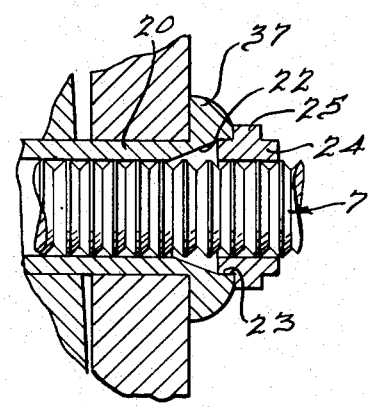
Fig. 11 is a partial view similar to Fig. 1, and showing a modified form of fastener.

In Fig. 11, the elements are the same as those described above in Figs. 1–6, except that the filler sleeve 20 is formed with a protruding head 37 rather than the countersink head in Fig. 1. The protruding head is a conventional form of fastener head, and the cavity 22 is located within the head in the same way as above described for reception of the locking collar 24.

Figure 12:
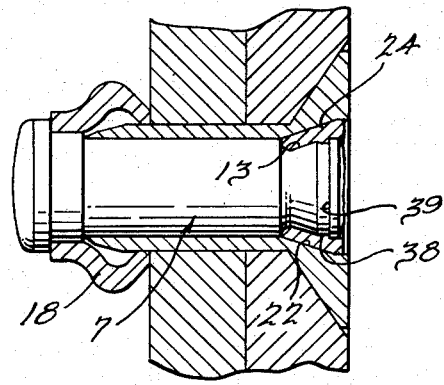
Fig. 12 is a view similar to Fig. 5, and showing a modified form of fastener.

In Fig. 12, a modified form of pin is illustrated in which an annular step 38 of reduced diameter is provided adjacent the locking groove 13 forming a shoulder 39, so that when the collar 24 is forced into the locking space provided between the locking groove 13 and annular space 22, a portion of the collar 24 will be forced down around or behind the shoulder 39, and thus provides an additional lock to prevent dislodgement of the collar 24 of the final fastener.

Formal changes may be made in the specific embodiments of the invention described without departing from the spirit of the invention, the scope of which is commensurate with the appended claims.

What is claimed is:

1. A blind fastener for connecting a pair of adjacent parts, said fastener including a filler sleeve formed of a material having a high shear strength and having a head on one end provided with an axial cavity and adapted to seat in one side of said parts in a flush relation with said one side, said filler sleeve being of a length to extend completely through said parts so that the opposite end of the sleeve is on the opposite side of the parts, a pin frictionally supported in said filler sleeve and provided on one end with a head positioned in a spaced relation with said opposite end of the sleeve, said pin being formed intermediate the ends thereof with a locking groove, an expandable sleeve on said pin between said head and said filler sleeve and arranged in abutting engagement at one end with said opposite end of the filler sleeve so that on movement of the pin axially of the filler sleeve in a direction to move the pin head against the opposite end of the expandable sleeve the expandable sleeve is expanded over said filler sleeve and collapsed to a position forming a stop on said opposite side of the parts extending between the head and said opposite side of the parts, a separate locking collar on the pin movable into a position within the filler sleeve cavity and the pin locking groove in a position of the pin corresponding to said stop forming position of the expandable sleeve so as to frictionally lock the pin and filler sleeve together in said positions, guide means on the pin supporting the collar in a coaxial relation with the pin, said collar having an exterior annular shear flange of a diameter greater than the diameter of said cavity, the strengths of said collar flange and said expandable sleeve being relatively proportioned such that the total force on the sleeve in one direction necessary to collapse and expand the sleeve is less than the total force on the collar in the opposite direction necessary to shear off said flange and frictionally lock the collar to the filler sleeve and the pin, said pin having a breakneck portion located within said sleeve head in the position thereof locked to the pin, said pin being of a strength to be fractured at said breakneck portion on application of a force to said pin greater than said force on the collar.

2. A blind fastener for connecting a pair of adjacent parts, said fastener including a filler sleeve formed of a material having a high shear strength and having a tapered head on one end provided with a flat outer end surface and an axial cavity in said surface, said head being adapted to seat in a counter-sunk opening in one side of said parts so that said flat surface is flush with said one side, said filler sleeve being of a length to extend completely through said parts so that the opposite end of the sleeve is on the opposite side of the parts, a pin frictionally supported in said filler sleeve and provided on one end with a head positioned in a spaced relation with said opposite end of the sleeve, said pin being formed intermediate the ends thereof with a locking groove, an expandable sleeve on said pin between said head and said filler sleeve and arranged in abutting engagement at one end with said opposite end of the filler sleeve so that on movement of the pin axially of the filler sleeve in a direction to move the pin head against the opposite end of the expandable sleeve the expandable sleeve is expanded over said filler sleeve and collapsed to a position forming a stop on said opposite side of the parts extending between the head and said opposite side of the parts, a separate locking collar on the pin movable into a position within the filler sleeve cavity and the pin locking groove in a position of the pin corresponding to said stop forming position of the expandable sleeve so as to frictionally lock the pin and filler sleeve together in said positions, spaced annular guide lands extending about said pin at positions supporting said locking collar in a coaxial relation with the pin at all times, said collar having an exterior annular shear flange of a diameter greater than the diameter of said cavity, the strengths of said collar flange and said expandable sleeve being relatively proportioned such that the total force on the sleeve in one direction necessary to collapse and expand the sleeve is less than the total force on the collar in the opposite direction necessary to shear off said flange and frictionally lock the collar to the filler sleeve and the pin, said pin having a breakneck portion located within said sleeve head in the position thereof locked to the pin, said pin being of a strength to be fractured at said breakneck portion on application of a force to said pin greater than said force on the collar.

3. A blind fastener comprising a filler sleeve formed of a material having a high shear strength and having a head on one end provided with an axial cavity, a pin frictionally supported in said filler sleeve and provided on one end with a head positioned in a spaced facing relation with said opposite end of the sleeve, a shoulder on said pin adjacent said head, an expandable sleeve on said pin between said shoulder and said filler sleeve and arranged in abutting engagement at one end with said opposite end of the filler sleeve so that on movement of the pin axially of the filler sleeve in a direction to move the shoulder into the expandable sleeve so that the pin head is against the opposite end of the expandable sleeve the expandable sleeve is expanded about said filler sleeve and is collapsible outwardly intermediate the ends thereof, said shoulder being engageable with said opposite end of the filler sleeve to terminate said pin movement, spaced annular guide lands on a portion of said pin intermediate the ends thereof, and a separate locking collar supported on said guide lands in a coaxial relation with said pin at a position adjacent said sleeve head for movement into a position within the filler sleeve cavity frictionally locked to the pin in the last mentioned position thereof, said collar having an exterior annular shear flange of a size to engage the portion of said filler sleeve head bounding the opening therein, the strengths of said collar flange and said expandable sleeve being relatively proportioned such that the total force on the sleeve in one direction necessary to collapse and expand the sleeve is less than the total force on the collar in the opposite direction necessary to shear off said flange and frictionally lock the collar to the filler sleeve and the pin, said pin having a breakneck portion located within said sleeve head in the position thereof locked to the pin, said pin being of a strength to be fractured at said breakneck portion on application of a force to said pin greater than said force on the collar.

4. The structure of claim 1 in which the portion of said expandable sleeve adjacent said one end is of a reduced thickness.

5. The structure of claim 1 in which said filler sleeve is formed intermediate its ends with an externally grooved portion engageable with said one end of the expandable sleeve in the stop-forming position of said expandable sleeve.

6. The structure of claim 1 in which said filler sleeve is formed intermediate its ends with a locking groove located in the outer surface of the filler sleeve for receiving said one end of the expandable sleeve in the stop-forming position of said expandable sleeve.

7. The structure of claim 1 in which said pin is formed with a shoulder located within said locking groove and facing said pin head for engagement with said locking collar to prevent retraction thereof from said cavity.

(References on following page)

References Cited in the file of this patent

UNITED STATES PATENTS

| | | |
|---|---|---|
| 2,061,628 | Huck | Nov. 24, 1936 |
| 2,099,678 | Curtis | Nov. 23, 1937 |
| 2,298,203 | Eklund | Oct. 6, 1942 |
| 2,372,904 | McCarthy | Apr. 3, 1945 |
| 2,526,235 | Huck | Oct. 17, 1950 |
| 2,531,049 | Huck | Nov. 21, 1950 |

FOREIGN PATENTS

| | | |
|---|---|---|
| 472,329 | Great Britain | Sept. 22, 1937 |